United States Patent [19]

Ritter et al.

[11] Patent Number: 4,741,889

[45] Date of Patent: May 3, 1988

[54] PROCESS FOR ADSORPTIVE REMOVAL OF SUBSTANCES FROM FLUE GASES

[75] Inventors: Jürgen Ritter, Uitikon, Switzerland; Erich Sundermann; Hanno Laurien, both of Braunschweig; Hans Reye, Neustadt, all of Fed. Rep. of Germany

[73] Assignee: Perfluktiv Technik AG, Zug, Switzerland

[21] Appl. No.: 810,281

[22] PCT Filed: Mar. 16, 1985

[86] PCT No.: PCT/EP85/00111

§ 371 Date: Jan. 9, 1986

§ 102(e) Date: Jan. 9, 1986

[87] PCT Pub. No.: WO85/04343

PCT Pub. Date: Oct. 10, 1985

[30] Foreign Application Priority Data

Mar. 24, 1984 [DE] Fed. Rep. of Germany ....... 3410895

[51] Int. Cl.$^4$ .......................... B01J 8/00; C01B 17/00
[52] U.S. Cl. .................................... 423/239; 423/235; 423/242; 423/244
[58] Field of Search .............. 423/235, 235 D, 244 A, 423/242 A, 244 R, 239, 239 A

[56] References Cited

U.S. PATENT DOCUMENTS

| | | | |
|---|---|---|---|
| 2,780,310 | 2/1957 | Schaub | 423/244 |
| 3,389,536 | 6/1968 | Bull | 55/174 |
| 3,862,295 | 1/1975 | Tolles | 423/244 |

FOREIGN PATENT DOCUMENTS

| | | |
|---|---|---|
| 2433076 | 2/1975 | Fed. Rep. of Germany . |
| 2911712 | 9/1980 | Fed. Rep. of Germany . |
| 3101053 | 3/1983 | Fed. Rep. of Germany . |
| 3210682 | 9/1983 | Fed. Rep. of Germany . |
| 57-27115 | 2/1982 | Japan . |
| 2126870 | 10/1983 | United Kingdom . |
| 683800 | 9/1979 | U.S.S.R. . |
| 895487 | 7/1982 | U.S.S.R. . |

OTHER PUBLICATIONS

"Industrial Adsorption of Gases & Vapors" by: Sepionova; Published by: Ministry of Higher and Intermediate Special Education (for students of Technological Processes in Chemistry)—1969.

Chem. Ing.-Techn 55 (1983) No. 2, S.87–93.

*Primary Examiner*—Gregory A. Heller
*Attorney, Agent, or Firm*—Karl F. Ross; Herbert Dubno

[57] ABSTRACT

In the process for reducing the noxious substance contents of flue gas, particularly flue gas desulphuration by dry process, the adsorber (1) and/or the regenerator (2) are built like a shaft. Active coke is introduced in the shaft in plane heaps with free intervals between each other: the coke is transported batchwise from top to bottom and is traversed by the flue gas. The heaps are supported by grates (6) of which the bars may come out at least partially from the grate plane so as to disintegrate the heaps and to bring them to the following stage in the form of a trickling flow, so that a constant thickness with respect to the cross-section is maintained. The infeed and evacuation of the flue gas with shaft-like absorber (1), respectively the gas streams in a shaft-like regenerator (2) are carried out in such a way that at least a preponderant number of heaps is traversed from bottom to top. Optionally it is possible to provide in the adsorber a mixture with $NH_3$ gas in order to denitrify the flue gas. In case of reduced active coke need and reduced abrasion there is obtained a good purification effect.

12 Claims, 9 Drawing Sheets

PROCESS FOR ADSORPTIVE REMOVAL OF SUBSTANCES FROM FLUE GASES

The invention relates to a process for decreasing the noxious substance content of flue gases, in particular for desulphurizing flue gases, with the aid of an adsorber and a regenerator of which at least one is of shaft-shaped design and through which activated coke beds are passed which each successively travel through the adsorber and the regenerator, the flue gas being passed through the bed in the adsorber for charging the activated coke with noxious substances, while the bed is heated in the regenerator with inert gas and the adsorbed substances are vaporized and passed onward for further treatment.

BACKGROUND OF THE INVENTION

Besides wet processes for cleaning flue gases from power plants, refuse incineration plants and the like and in order to avoid the disadvantages which have to be considered in this context, such as high energy requirements and resulting chemically highly polluted waste water, processes of the type referred to in the field of the invention have become known in which the treatment of the flue gases proceeds in a dry state and wherein during the recovery of substances removed from the flue gases an at least partial treatment takes place wherein liquids are used.

In this context the BF process for flue gas desulphurizing and NO reduction is known (Article by K. Knoblauch in "Erzmetall 33" (1980) No. 2, Page 109 to (114) and operates as described in the Field of the Invention and in which activated coke beds are conveyed in circulation through an adsorber in the form of a ring silo reactor and a moving bed reactor similarly of shaft-like construction. In that case transverse flow through the material takes place in the ring silo reactor, while in the moving bed reactor there is merely a mixing of the activated coke with hot sand followed, after this mixture has passed through the reactor, by a re-separation into sand and activated coke. The enriched gas which is formed in the reactor during such regeneration of the activated coke is withdrawn and by further treatment re-usable sulphur products such as elemental sulphur, sulphuric acid or liquid $SO_2$ are recovered therefrom by further treatment.

It has also become known (brochure of the West German firm Uhde: "Plant for flue gas purification") to retain the above described adsorber in the form of a ring silo reactor and to use a regenerator or desorber designed as a fluidized bed chute followed by a cooler similarly in the form of a fluidised bed chute. In the regenerator in the form of a fluidized bed chute the coke bed contained in this fluidized bed is subjected to a flow therethrough of a heated inert gas, the enriched gas formed by the desorption being withdrawn.

In this process, moreover, the flue gas treatment in the adsorber is effected in the temperature range of 100° to 150° C. without cooling of the flue gases, while the activated coke bed in the regenerator must be heated to temperatures of 500° to 650° C. either with the aid of the aforementioned hot sand or by appropriately heated inert gases, in order to bring about the desorption and the formation of the enriched gas.

In both aforesaid processes it is possible to decompose at least partly catalytically the nitrous oxide present in the flue gas by the addition of certain amounts of $NH_3$ prior to or during the treatment of the flue gases, to remove these noxious substances at least partly from the flue gas.

The known processes require comparatively large amounts of activated coke in order to attain the required intensive and adequately long contact of the gases with the surface of the activated coke particles during the flow of the gases through the bed. In spite of the large amounts of activated coke a uniformity of treatment of the relatively large gas throughputs traversing the bed cannot be attained. In part this is due to fact that the flow paths of the gases through the bed are relatively short even where large quantities of activated coke are involved and because mechanical irregularities in the bed cannot be compensated for aerodynamically in the course of the flow of the gases therethrough. Moreover, the gases depending on their entry localities in the bed contact activated coke particles which are quite differently loaded, as a result of which the reactions between the gas and the activated coke are correspondingly of different intensity. Because in the known process parts of the flue gas flow enter into contact only with activated coke particles which are already highly loaded, the affected partial gas flows are subjected to a correspondingly reduced reduction of the noxious substance content, and this has an adverse effect on the overall result.

The aforesaid drawbacks arise in an analogous manner also during the treatment of the activated coke for purposes of desorption in those cases where the activated coke is heated in the regenerator by means of inert gas. The result is that for carrying out the known process, exceptionally large plants are required. In spite of this, the known processes do not permit an adequate denitrification of the flue gases. For that purpose it may be necessary to use additional measures.

OBJECT OF THE INVENTION

It is the object of the invention to provide a process which obviates the aforementioned drawbacks.

SUMMARY OF THE INVENTION

In accordance with the present invention there is provided a process of the type generally described above wherein activated coke having a uniform particle size of at least 6 mm and up to a maximum of 25 mm is formed into beds of uniform bed thickness all across in the adsorber and/or regenerator which is in the form of a shaft by being metered in a uniform redistribution according to the cross sectional area of the shaft and the beds are introduced into a plurality of beds separated one above the other, leaving a free interspace between one bed and the next in the shaft or shafts, each bed being supported by a grid. At least the major portion of the beds is subjected to a flow therethrough of the flue gas or of inert gas from the bottom upwards in a direction normal to the bed planes the beds after predetermined periods of residence in the individual levels, are conveyed batchwise (bed-by-bed) starting with the lowermost bed downwardly through the shaft and by a controlled movement of at least part of the grate or grid rods of each grid out of the grate plane, the beds being broken up and so conducted in the form of a uniform trickle flow to the next lower grate that on the latter a new bed is formed of uniform bed thicknesses right across.

By virtue of the aforedescribed use of activated coke having the aforementioned uniform particle size of from 6 to 25 mm there result in the described formation of the planar beds adequate interstices between the activated coke particles through which the gas is conveyed so as to flow around the individual activated coke particles.

The gas during its flow through the interstices between the activated coke particles at relatively high flow velocities is subjected to intensive mixing and contact with the surface of the activated coke particles such that a very effective material exchange takes place.

In this context all beds maintained in the flow passage of the gases arranged one above the other are subjected to a uniform flow therethrough of the entire gas volume.

The partial or predominating countercurrent flow provided for the gas through the beds favors in a known manner a material exchange or a degree of reaction between the gases and the activated coke particles. The free interspaces provided between the bed contribute to a better uniformity of the gas flow.

If, however, due to some irregularity the gases emerge from one or other bed locally at different pressures or different flow velocities viewed over the bed cross section, in the adjacent free interspace there will be pressure and flow compensation or equalization such that the next following bed viewed in the direction of flow is entered by the gas substantially uniformly, once again considering the cross sectional area as a whole.

Since of all the beds present in the flow path of the gases are subjected to uniform flow therethrough in succession in the new process and also to a considerably more intense contact between the gas and the activated coke particles, it is possible to operate with a substantially smaller amount of activated coke than in the case of the known processes described above the introduction.

In order to attain uniform transfer processes involving all activated coke particles of each of the beds subjected to flow therethrough, it is important that the activated coke particles at the different levels each form beds of uniform bed thicknesses, from the time of introduction of the beds into the shaft to their discharge from the shaft.

This is attained by the which serve for supporting the beds and which permit the flow therethrough in such manner that at least part of the rods of each rod are adapted to be moved out of the plane of the, whereby the beds are broken up.

By appropriate control and function of time of the raising and/or lowering of the movable rods, it is possible to bring about the trickle movement desired for the formation of the next bed with a uniform bed thickness. It is possible to adjust the distances of levels of movement and the displacement of the grate rods to two or three different levels as a function of the shape and size of the activated coke particles. By appropriate trickle experiments it is possible to appropriately predetermine the most favorable results. The described controlled movement of the grate rods moreover has the effect that bridge formations which may have arisen in the individual beds are broken up.

The period of residence of the beds on the individual grates and thereby the overall reaction period of the mutual interaction between the gas and the activated coke particles is determined substantially by the desired and actually attained parameters of the gas emerging form the last bed. If for example, in an adsorber for desulphurizing flue gases, the gas emerging from the adsorber due to increasing loading of the activated coke and the increasing residual content of sulphur resulting therefrom, were to reach a predetermined upper limit, it is necessary to discharge the lowermost bed and to carry out the described downward transfer, bed-by-bed, of the remaining beds so that a bed of fresh or regenerated activated coke can be introduced into the shaft to be subjected gas flow therethrough in place of a loaded bed, resulting in a reduction of the residual content of $SO_2$.

In the new process only 20 to 30% of the amount of activated coke is required, compared with the earlier process The process of the invention can be carried out in conjunction with an adsorber designed as a shaft as well as with a correspondingly designed regenerator. It is particularly advantageous if the described bed-stepping process is carried out in conjunction with the adsorber as well as with the regenerator.

The new process in conjunction with a shaft-like adsorber permits a very effective desulphurization of flue gas and if required, also the simultaneous denitrification of the flue gases. In those cases in which the flue gas contains no nitrous oxide, for example refining waste gases, preferably the the flue gas is passed in countercurrent through all beds maintained in the shaft. This substantially single stage treatment of the flue gas requires a minimum of complexity while its effectiveness is high.

If on the other hand, flue gases are involved which also contain nitrous oxide which must be eliminated from the gas down to a permissible residual amount, it is preferred to mix the flue gas for denitrification prior to the flow through a bed and/or at least during the flow through some of the beds with injected $NH_3$ gas, in each case the mixing being effected in a free space outside the bed.

Hence the flue gas during its passage through the shaft, more particularly inside the shaft, is mixed with the injected $NH_3$ and this mixing can take place even prior to entering the first bed through which the gas has to pass and/or after the flue gas has passed through some of the beds and prior to its the onward passage to further beds.

The mixing of the flue gas with the injected $NH_3$ in the free interspaces between the beds or prior to entering the first bed in the shaft takes place extremely intensively, such that during the subsequent passage through the beds all activated coke particles enter into contact with this gas mixture. Apart from the admixture of $NH_3$ gas to the flue gas no additional measures for separating the nitrous oxide from the flue gas are required. The injection of the $NH_3$ gas in the described manner moreover offers the great advantage that during a flow of this gas mixture through beds of activated coke which have already been charged with $SO_2$, a chemical decomposition reaction with the adsorbed $SO_2$ takes place and that during the passage of the gas mixture through those beds which are not loaded or are less intensely loaded, the additional catalytic decomposition of the nitrous oxide is attained.

In a particularly advantageous modification of the process in conjunction with a shaft-like adsorber, provision is made for the flue gas to initially pass in countercurrent through the majority of the beds and to cause admixture of injected $NH_3$ gas in one or more free interspaces outside the beds, followed by feeding through a group of beds through which the flue gas has already flown. It is particularly advantageous if prior to the passage of the flue gas through the group of beds through which a flow has previously taken place, the admixture of $NH_3$ gas is effected in a free space outside of the beds. When applying these process features, there is initially a substantial desulphurization of the flue gas and thereafter in combination with a further desulphurization also a denitrification by catalytic decomposition while in the final phase the residual separation of $SO_2$ and a decomposition of any nitrous oxide still present by chemical reaction with the previously loaded beds is carried out.

This modification of the process if a three-stage operation, wherein the gas in the final stage may optionally be conducted either in cocurrent or in countercurrent with the beds.

In the new process a circulated flow of inert gas is advantageously passed through a group of beds of the discharge end of the shaft for cooling these beds, and is then passed through a group of beds at the feed end for the preheating thereof, in each case in countercurrent. Through the beds between the groups at the feed and discharge ends another flow of inert gas heated to about 600° C. to 650° C. can be passed and, after the formation of enriched gas, the latter, heated to 600° to 650° C. is circulated through the beds and the excess enriched gas formed in the circuit is withdrawn.

This path of the inert gas results in a cooling of the beds being discharged from the regenerator with the heat adsorbed by the gas being transferred to those beds which enter the regenerator and which in the described manner for the purpose of desorption must be heated to about 600° to 650° C.

During the above described treatment of the beds in the regenerator, the same advantages mentioned in conjunction with the adsorber resulting from the beds supported on the spaced apart grates and the flow therethrough in the context of material and heat transfer processes as well in relation to the uniformity with which the processes take place, and the above described advantages of reduced reaction times are also attained.

If in the circulating inert gas for cooling and preheating the beds a gas excess occurs as a result of a desorption which has already started or after the heating of the beds due to a previously incomplete desorption therein, such excess gas can be passed in a simple manner into the flue gas introduced into the adsorber.

The process according to the invention is not only suitable for desulphurizing and simultaneous denitrification, but also can be applied to flue gas which has already been treated and thereby substantially desulphurized in known plants, in particular for the purpose of the nitrification and final desulphurizing. For that purpose shaft-shaped embodiments of the adsorber and regenerator are used advantageously which have only relatively few beds of activated coke arranged one above the other. In that case a single stage treatment of the desulphurized flue gas may take place in the adsorber. The $SO_2$-containing gas formed during the regeneration may in the aforesaid treatment of the desulphurized flue gas be returned to the raw gas and be reintroduced into the desulphurizing plant preceding the adsorber.

According to further aspect of the invention, a the active coke is in the form of granulates having an inactive core of ceramic material and a coating of activated coke based on black coal.

BRIEF DESCRIPTION OF THE DRAWING

The drawing represents working examples of the invention illustrated diagrammatically. In the drawing

SPECIFIC DESCRIPTION

Figure 1:
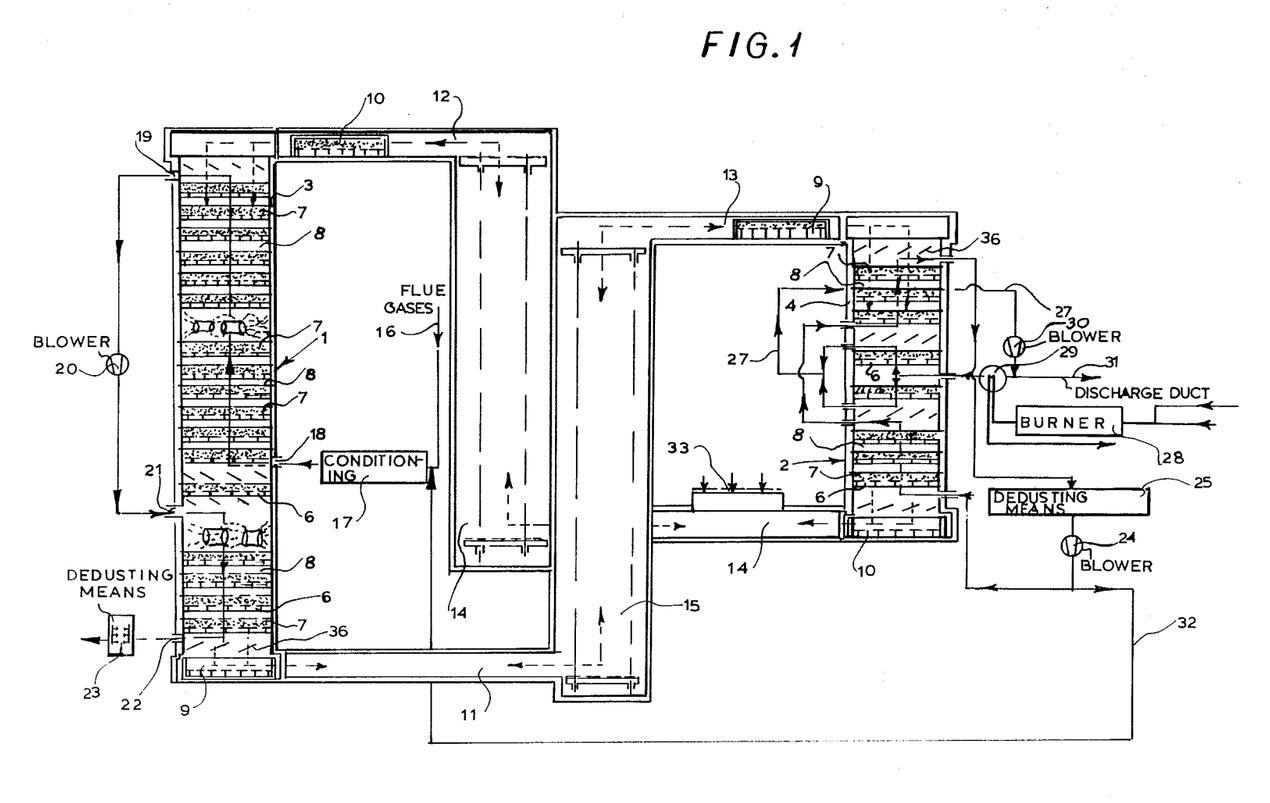
FIG. 1 is a diagrammatic sectional view of a plant according to the invention or for carrying out a process according to the invention and including an absorber and a regenerator through which the coke beds are circulated.

FIG. 1 illustrates an adsorber, overall denoted as 1 and a regenerator, overall denoted as 2, the construction and operation of which will be described in detail in conjunction with FIGS. 4 and 5.

It is apparent from FIG. 1 that the adsorber 1 as well as the generator 2 take the form of shaft 3 and 4 respectively, subdivided into chambers by grates 6 spaced apart one above the other. The grates 6 serve for supporting beds 7 of activated coke particles or granulates of uniform particle sizes of at least 6 and not more than 16 mm. The beds 7 take the form of plane beds of which the bed thicknesses are uniform all across and are introduced in that configuration into the respective shafts 3 and 4 of the adsorber 1 and the regenerator 2 respectively and are so discharged from the shaft as well. It will be seen that between the respectively adjoining beds 7 free interspaces 8 are provided which may also be referred to as free flow cross sections and which can have different sizes if additional internals are to be fitted into these spaces.

The beds 7 are formed by a uniformly metered distribution of activated coke particles or granulates and travel through the shaft 3 and 4 of the adsorber 1 and regenerator 2 respectively in each case from the top downwards. The circulation of the bed 7 through the adsorber and the regenerator proceeds by means of transport containers 9 or 10 adapted to the cross section of the shafts 3 and 4 respectively and each equipped with a grid-serving as the bottom and being of the same design as the grids 6 in the shaft 3 and 4. Conveyor tunnels 11 and 12 and 13 and 14 respectively and a lifting device 15 interconnecting these serve to convey the transport boxes 9 and 10 respectively in the direction of the respectively shown arrows in such a manner to and fro that the transport boxes 9 in each case convey the lowermost loaded bed emerging from the shaft 3 of the adsorber 1 to a locality above the inlet aperture, i.e. into a position above the shaft 4 of the regenerator and transfer the bed into the shaft 4 by the operation of the associated bed in a manner still to be described. The passage of the transport vessel 10 is in the opposite sense serving to accommodate the lowermost bed from the shaft 4 of the regenerator 2 and transferring it into a position above the shaft 3 of the adsorber 1 and from there into the adsorber when the uppermost grid in the shaft has become unoccupied.

The apparatus illustrated in FIG. 1 is so operated that the flue gases are passed in the direction of the arrow 16 through an apparatus for conditioning 17 prior to being introduced through an inlet aperture 18 through the wall of the shaft 3 into the shaft interior and passing from the bottom upward in the direction of the arrow through the bed maintained above the inlet aperture 18. Through an upper outlet aperture 19 the flue gas is withdrawn by means of a blower 20 and fed through an inlet aperture 21 further below once again into the lower part of the shaft 3. It then flows through the bed maintained underneath the inlet aperture 21, prior to passing through the outlet aperture 22 into a dedusting plant 23 and from there into the atmosphere in the form of cleaned flue gas.

Apart from the bed maintained between the two inlet apertures 18 and 21, all beds 7 in the shaft 3 are passed successively by the flue gas, and the design and configuration of the flat bed of activated coke particles or granulates result in an intense flow of the flue gas around all granules of the bed 7 and thereby in a particularly effective adsorbtion which is essential for cleaning the flue gas.

The beds maintained in the shaft 3, starting from the outlet of the lowermost bed are conveyed from the top to the bottom level by level. Due to the counterflow conductance of the flue gases in the upper part of the shaft in relation to the beds 7, these beds 7 in the shaft are loaded to an increasing extent with adsorbed noxious substances viewed from the top downwards. The beds uppermost in the shaft are accordingly highly receptive for adsorbing the noxious substances, such that a particularly favourable cleaning effect of the gases is attained. The cycle periods of residence are so adjusted that the gas emerging from the uppermost bed does not exceed a predetermined residual amount of noxious substances, in particular of $SO_2$.

The absorber 1 illustrated in FIG. 1 at the same time serves for the denitrification of the flue gases, which, however, will be described in more detail in the context of FIG. 4. At this stage it is merely mentioned that the flue gases in the context of their denitrification and after having passed through the major portion of the bed 7 are once again introduced in countercurrent into the shaft through the inlet apertures 21 and passed in cocurrent through the beds 7 already charged with $SO_2$.

Each of the beds when discharged from the bottom of the shaft 3 of the adsorber 1 is moved by way of the transport vessel 9 via the lifting means into a position above the regenerator 2 and is then conveyed batchwise in the same manner as described further above in conjunction with the adsorber through the shaft 4 of the regenerator and is conveyed through the regenerator from above downwards after predetermined periods of residence on each of the grids 6 of the regenerator.

In the regenerator, details of the function of which will be described in conjunction with FIG. 5, a preheating of the bed 7 proceeds in the upper region, followed by heating of the bed to a temperature of about 600° to 650° C. in the central region for the purpose of desorption and by cooling of the bed to about the temperature of the flue gases fed into the adsorber, i.e. to a temperature of about 150° C. in the lowermost region of the regenerator.

It will be seen from FIG. 1 that the lower and upper beds maintained in the shaft 4 of the regenerator 2 form part of a circuit 26 in which a blower 24 and dedusting means 25 are provided. The two beds in the central region of the shaft 4 of the regenerator form part of the second circuit 27 in which a blower 30 is provided and in which moreover a heat exchanger is provided which coacts with a burner 28. As part of the circuits 26 and 27 feed and discharge apertures 26a to 26d and 27a to 27c respectively are provided in the shaft walls and between the beds for feeding and discharging the gas into and from the interior of the shaft 4. The feed and discharge apertures 26a to 26d are associated with the circuits 26 and the feed and discharge apertures 27a to 27c with the circuits 27.

A discharge duct 31 is connected to the circuit 27. The desorption due to the heating of the activated coke particles results in the circuit 27 in a gas excess and an enrichment of the gases $SO_2$ such that through the discharge line 31 the loaded gas highly enriched with $SO_2$ is passed for further processing.

Because it is possible in the circuit 26 for cooling and preheating the beds passed through the regenerator 1 that due to the desorption which at higher temperatures may already start or may not have been completed, there may arise a gas excess, a connecting line 32 is provided which feeds the excess gas to the flue gas prior to its introduction into the adsorber 1. The gas maintained in the circuit 26 as well as the gas required for starting up the circuit 27 is in those cases an inert gas whereby combustion or oxidation of the activated coke is avoided.

The conveyance of the beds through the regenerator proceeds in the same manner as with the adsorber, and care must be taken also in the regenerator that the planar and uniform bed thickness all over the cross section of the beds is maintained in the individual beds at all levels.

Because during the conveyance of the beds through the adsorber as well as through the regenerator abrasive losses are unavoidable, a means 33 is provided for replenishing the beds adapted for the metered addition of fresh coke for replenishing the individual beds. Such means for the addition of fresh coke may also be provided anywhere else in the coke circuit.

Figure 2:
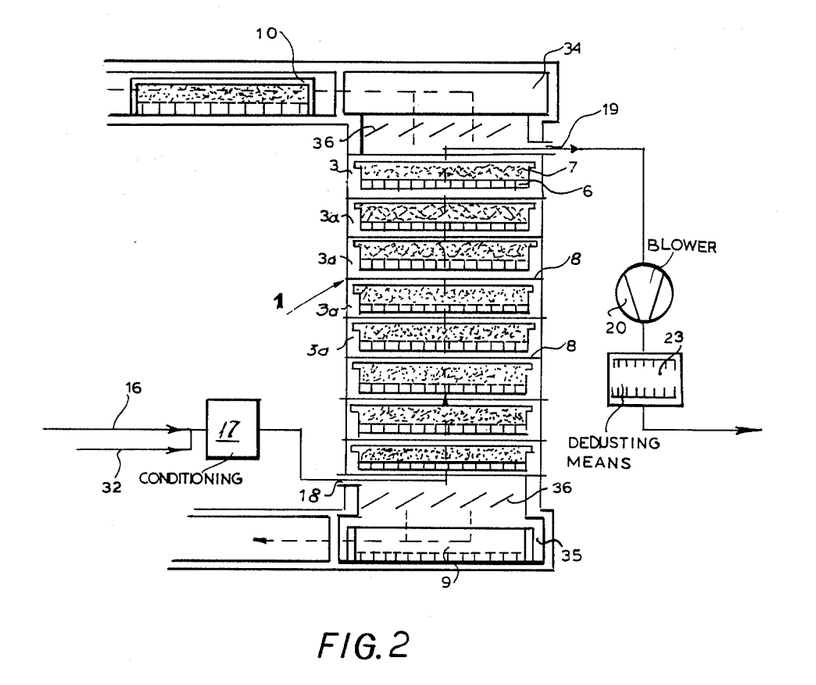
FIG. 2 is a diagrammatic longitudinal section through a first embodiment of an adsorber of an apparatus according to the invention.

A construction of the adsorber departing from that illustrated in FIG. 1 is shown in FIG. 2. To the extent that the adsorber according to FIG. 2 comprises the same components as the adsorber according to FIG. 1, the same reference numbers have been used.

The adsorber illustrated in FIG. 2, including its shaft 3 and the beds 7 supported therein on grids 6 composed of activated coke particles or granulates comprises at its upper and lower ends gates or locks 34 and 35 for feeding and discharging the beds and which are also provided in the adsorber and the regenerator according to FIG. 1. The adsorber according to FIG. 2 is suitable solely for the desulphurisation of flue gases which are fed there into in the direction of the arrow 16 and by way of a conditioning means 17 through an inlet aperture 18. The flue gases flow through all of the beds 7 contained in the shaft 3 of the adsorber 1 through the bottom upwards before the flue gases are discharged again from the shaft at the outlet aperture 19 and are passed by means of blower 20 and via a dedusting means 23 into the atmosphere.

The feeding and discharging of the beds 7 to the adsorber 1 according to FIG. 2 proceeds in the manner already described in the context of FIG. 1 by way of transport boxes 9 and 10.

The flue gas is passed through the adsorber 1 according to FIG. 2 in countercurrent to the beds 7 through the shaft 3. If any irregularities or variations in flow velocity should arise across the shaft cross section during the flow through the one or other bed, there will always be attained a pressure and flow velocity compensation in the previously described manner in the interspaces 8 between the adjoining beds 7, such that the next following bed will once again receive the flow in a uniform manner across its entire cross sectional area and the irregularities will not have any interfering effect viewed over the overall height of the shaft.

Due to the countercurrent conductance of the flue gases in relation to the beds 7, there arises in the direction of conveyance of the beds, i.e. in the shafts from the top downwards an increasing loading of the beds which in the manner described in conjunction with FIG. 1 has a favourable effect on the adsorbtion of noxious substances by the adsorption thereof on the surfaces of the activated coke particles or granulates maintained in the beds subjected to the flow.

Due to the intense flow around all of the activated coke particles contained in the beds, there results a correspondingly effective adsorption of $SO_2$ on the surfaces of the material particles. In practice flow velocities of about 1 to 1.1 m per sec, measured in the free interstices 8 between the adjoining beds 7 is maintained. The flow velocity within the beds is correspondingly higher. In the interstices between the material particles there takes place an intensive turbulence of the flue gases resulting in a correspondingly more frequent contact of the gas molecules with the surfaces of the material particles contained in the bed.

The height of the bed in practice is of the order of 0.2 to 0.2 m where the activated coke particles or granulates have a uniform size of 6 to 9 mm.

From FIG. 2 it is apparent that above and below the beds 7 partitions 36 are provided which in the manner of a Venetian blind can be moved into the closed and open position by pivoting of the louvre slats. These partitions 36 serve for the additional sealing of the shaft interior against exiting gases. Due to the pivotability of the slats, they do not, however, interfere with the feeding and discharge of the beds into or from the interior of the shaft 3.

The aforementioned partitions 36 are also apparent in the shaft constructions for the adsorber in the regenerator in FIG. 1.

Figure 3:
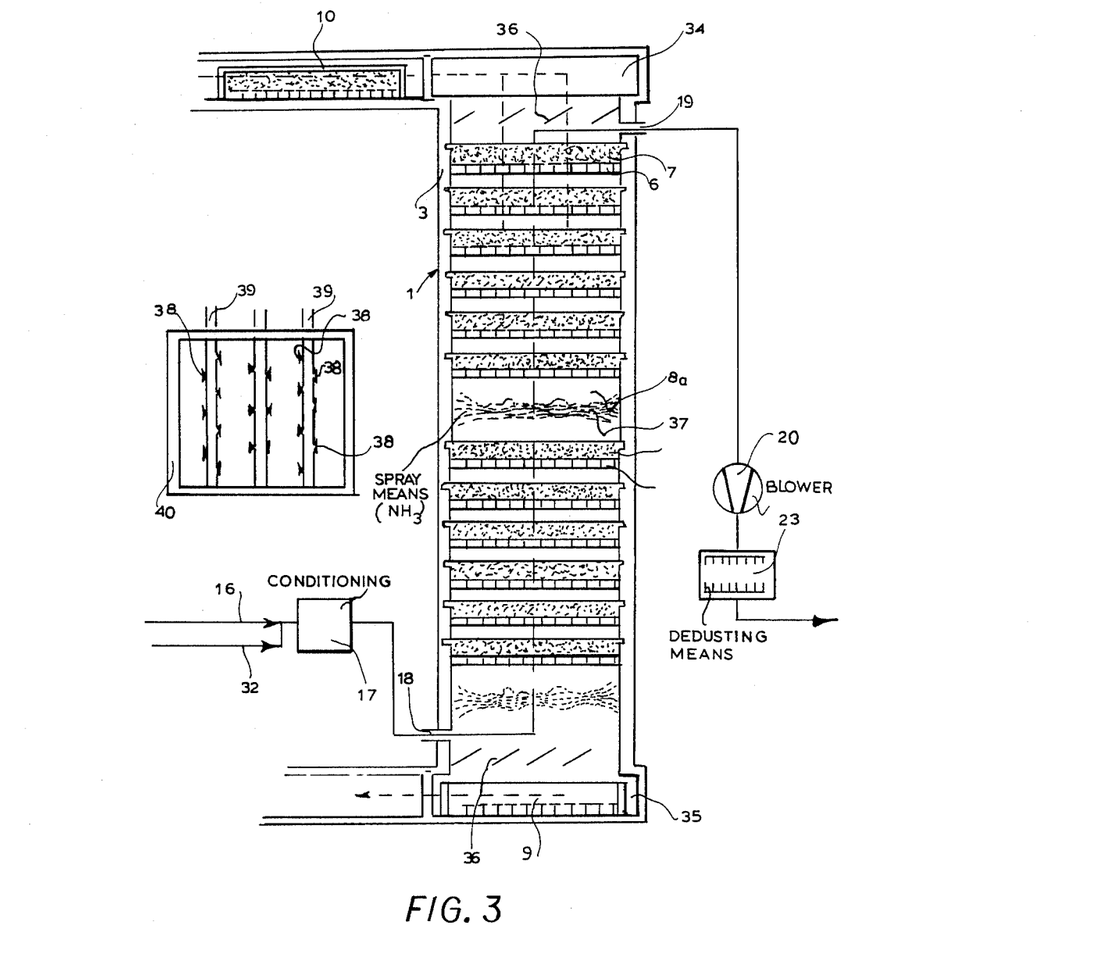
FIG. 3 is a section similar to FIG. 2 through an adsorber of a different embodiment of an adsorber.

FIG. 3 illustrates a second modification of the adsorber. Here once again the components corresponding to those in FIGS. 1 and 2 are denoted by the same reference numbers. The adsorber according to FIG. 3 denoted as a whole by 1 accommodates in its shaft 3 two mutually separated groups of beds 7 spaced apart by a major distance 8a and which are each supported on grids 6. The arrangement of the locks 34 and 35 as well as flue gas feed means corresponds to what is shown in FIGS. 1 and 2 and the adsorbers therein illustrated. The flue gas conductance takes place in the example of FIG. 3 in countercurrent as well through all of the beds 7 maintained in the shaft 3 of the adsorber 1.

Departing from the adsorber according to FIG. 2, the central region of the shaft 3 according to the embodiment of FIG. 3, in the expanded intermediate space 8a and according to the broken line illustration also below the lowermost bed in the shafts comprises a means 37 for the injection of $NH_3$ into the flue gas flow. These injection means 37 comprise in the illustrated example a group of spray nozzles 38 which are fitted to feed pipes 39 for the $NH_3$ gas and which jointly with a frame form a tube grid 40.

Due to the injection of the $NH_3$ gas into the flue gas flow here provided, the flue gas in the course of its being desulphurised is simultaneously subjected to a denitrification. The described spray means 37 permit a uniform distribution of the $NH_3$ gas over the entire flow cross section. Accordingly, the $NH_3$ gas is brought into close contact with the material particles contained in the beds over their entire cross section in the same manner as applies to the flue gas, and as a result a very high degree of denitrification of the flue gas to be purified is attained. In this context there takes place on the one hand, due to the reaction with the $SO_2$ already adsorbed by the activated coke particles a chemical reaction resulting in the decomposition of the nitrous oxides, whilst during the flow through the beds where the activated coke particles are little or not at all loaded with $SO_2$, a catalytical decomposition of the nitrous oxide is attained. For that reason it is recommended to provide a mixing of the flue gases with the $NH_3$ gas prior to the passage of the flue gases through the activated coke particles which are already heavily loaded with $SO_2$.

The magnitudes of the beds and of the flow velocities for the operation of the adsorber according to FIG. 3 correspond approximately to those which have been referred to in conjunction with FIG. 2.

Figure 4:
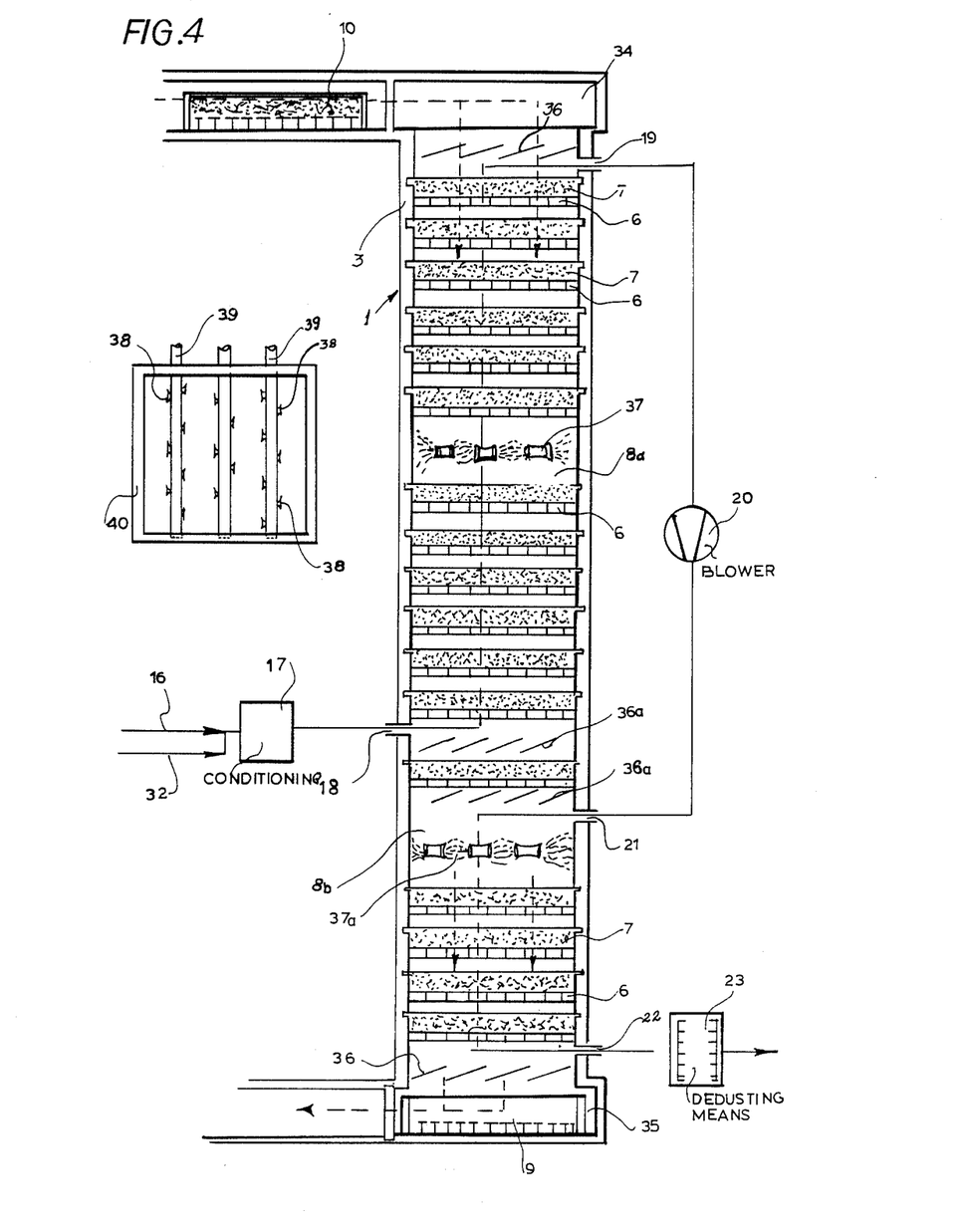
FIG. 4 is a section through an adsorber as shown in FIG. 1 on a larger scale.

The adsorber illustrated in FIG. 4 corresponds to the adsorber according to FIG. 1 and has been described already in conjunction with FIG. 1 in respect of its main constructive feature and its manner of operation. The components illustrated in FIG. 4 to the extent that they have already been mentioned and illustrated in the preceding figures have once again been denoted by the same reference numbers.

By comparison with the adsorber according to FIG. 3, the adsorber according to FIG. 4 does not provide for a countercurrent of the flue gases through all of the beds 7 maintained in the shaft 3, but the flue gases are passed through the passage 18 above a portion of the lowermost beds maintained in the shaft 3. As in the case of FIG. 2, a spray device 37 is provided above the beds which are initially subjected to a flow therethrough of the flue gases in the countercurrent zone, which has been described in some detail in conjunction with FIG. 3 and which is illustrated in plan view in the region next to the shaft 3 in FIG. 3 as well as in FIG. 4.

A further spray device 37a is provided in the case of the adsorber according to FIG. 4 in an expanded interspace 8b in the region of the inlet aperture 21 through which the flue gas pass in countercurrent through the upper bed is once again introduced into the shaft. The flue gas introduced into expanded interspace 8b, after being mixed with the NH₃ gas there introduced is passed in cocurrent through the lower beds 7. Because the beds 7 existing below the spray means 37a are already fully loaded with SO₂, there takes place during the passage through these beds by the mixture of flue gas and NH₃ gas the aforementioned chemical decomposition reaction whilst in the bed above the spray means 37, there is brought about an essentially catalytic decomposition of the nitrous oxides.

Between the gas inlet apertures 18 and 21 two spaced apart partitions 36a are shown in FIG. 4, corresponding in construction to the partition 36 of a Venetian blind type, between which a bed 7 is enclosed through which no gas flows. This serves as a blocking bed which in addition to the partitions 36a provides a reliable separation of the gases passed into the shaft interior through the feed apertures 18 and 21 respectively.

The feeding of the gases in cocurrent through the lowermost beds in the shaft 3 is advantageous, because gases entering the shaft interior through the inlet aperture 21 have approximately the same pressure as the gases which enter the shaft through the aperture 18 above the blocking bed, so that only minor pressure differences prevail between the free interspaces provided above and below the blocking bed. The flue gas intermixed with NH₃ flowing through the lowermost charged beds might just as well be fed through the lowermost beds in countercurrent with the proviso that in that case greater pressure differences would arise in the free interspaces below and above the blocking bed, which might favour a gas leakage from the one into the other free interspace.

Figure 5:
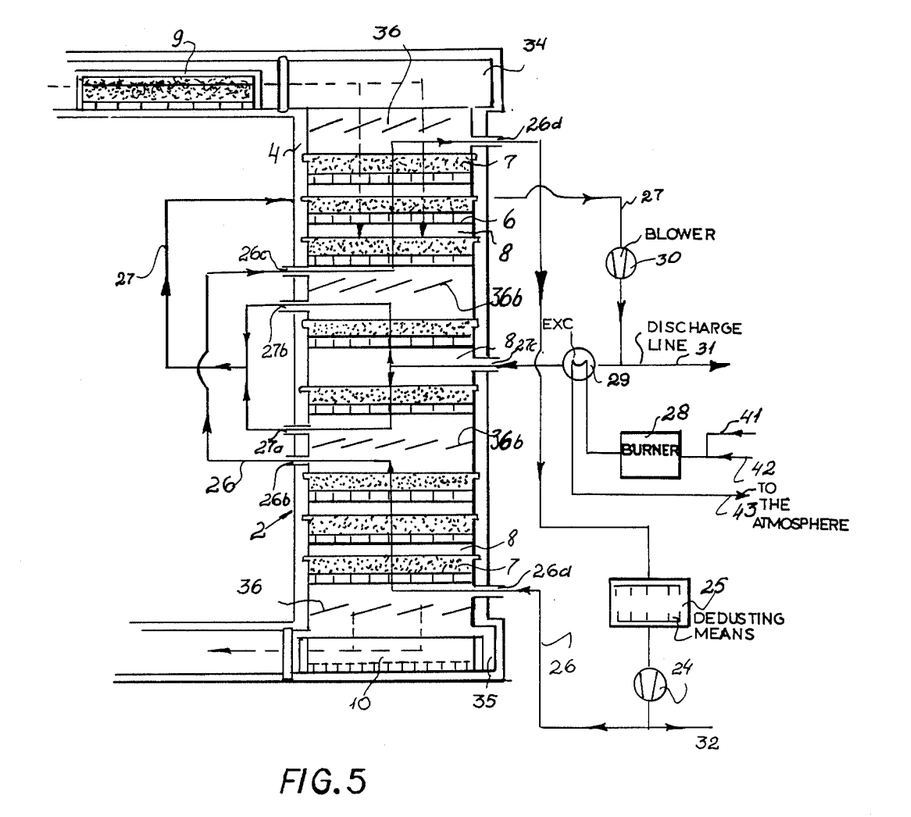
FIG. 5 is a section through the regenerator of FIG. 1, on a larger scale.

The regenerator illustrated in FIG. 5 corresponds to the regenerator illustrated in FIG. 1. The manner of functioning and the construction of this regenerator according to FIG. 5 have already been described substantially in conjunction with FIG. 1. Here as well, corresponding components in FIG. 1 and the remaining figures have been denoted by the same reference numbers.

It will be seen that the shaft 4 of the regenerator according to FIG. 5 is similarly equipped with inlet and outlet locks 34 and 35 respectively, and that above and below the beds 7 maintained in the shaft the partitions 36 of louvre blind type already described in conjunction with the adsorber are provided above and below the beds 7 maintained in the shaft 4.

For separating the two circuits 26 and 27 already described in conjunction with FIG. 1, further partitions 36 are provided in the shaft in the central region on both sides of the beds which form part of the circuits 27 and by which an intermixing of the gases of the circuits 26 and 27 is substantially prevented.

The beds 7 introduced into the shaft 4 of the regenerator have, if they are derived from the adsorber, a temperature of approximately 120° C. and are heated for the purpose of desorption whilst in their position between the partitions 36b to a desorption temperature of about 570° to 600° C. Their cooling proceeds during the further passage of these beds through the shaft 4 into the lower part of the shaft in which they are subjected to a flow therethrough of the gases of the circuit 26. The gases circulated in 26 thereby on exiting from the uppermost bed in the lower cooling zone attain a temperature of about 570°, such that during their onward conduction and passage through the uppermost beds in the shaft they bring about a corresponding heating of these beds and thereby the heat withdrawn from the cooling zone of the beds at the same time serves as useful heat for preheating the beds transferred into the desorption zone.

For the strong preheating of the beds which at any time are to be transferred in the desorption zone between the partitions 36b only a relatively low degree of heating of these beds is required for attaining the desired desorption in the circuits 27. According to the description in conjunction with FIG. 1, this is brought about by the burner 28 in conjunction with the heat exchanger 29. The burner 28 is fed with air through the feed duct 41, whilst gas is fed by way of the other feed pipe 42, whilst in the direction of the arrow 43 the flue gas of the burner is passed to the atmosphere.

Inert gas is used in the circuit 26. In order to start up the plant, inert gas is also initially used in the circuit 27 which, however, is replaced to an increasing extent during operation by the gas liberated by the desorption which becomes progressively enriched in SO₂ in the course of the circulation and is passed in the conventional manner for a partial withdrawal by way of the duct 31 and further processing for the recovery of sulphur, sulphuric acid or liquid SO₂.

The flow velocities in the regenerator when using activated coke particles or granulates of particle sizes of the order of 6 to 9 mm and a bed height of 0.2 to 0.3 m in the preheating and cooling zone, i.e. in the circuit 26, amount to about 3 to 3.5 m/sec, more particularly when measured in the free interspaces 8 between the adjoining beds. In the region of the desorption zone, i.e. in the region of the circuit 27, the flow velocity amounts to about 2.5 m per second, once again measured in the free interspace 8. In practice the cycle period amounts to about 5 minutes, i.e. the beds each are maintained for about 5 minutes on the individual grids. However, this period of residence is dependent on the number of grids within the shaft 4 of the regenerator and also is dependent on the throughflow velocity of the gases as well as the heights of the beds and the sizes of the individual bed particles or granulates.

The above described shaft constructions for the adsorber as well as for the regenerator may be composed advantageously of annular module members, such that the shaft heights can be changed in a simple manner according to different circumstances and requirements. The individual module units may in this context each comprise a grid or a spray device. They can be premanufactured in a such a manner that the shaft can be constructed in a simple manner. From FIG. 2 such a construction of the shaft 3 from module units denoted as 3a is apparent. In the same manner the remaining shafts illustrated in the remaining figures may also be assembled from such module units both in the case of the adsorber as well as the regenerator.

Figure 6:
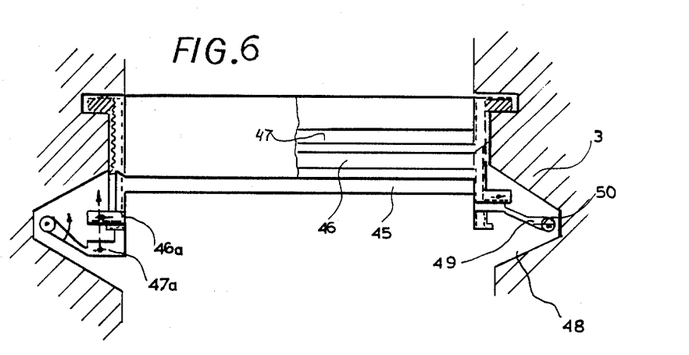
FIG. 6 is a partial section through the adsorber or regenerator in the form of a shaft at the level of a grate on a larger scale and from which details of the grate design can be seen.

The grids 6 provided in the shafts according to FIGS. 1 to 5, comprise according to FIGS. 6 to 8b in part stationary grid rods 45 and in part movable grid rods 46, 47, the latter being movable upwardly in respect of the stationary grids 45 from the plane of the grid in the example illustrated in order to temporarily increase the free gaps between adjoining grid rods. In FIG. 6 in the left hand part thereof, the position of the grid rods 45 to 47 in the grid plane is illustrated, whilst in the right hand portion the grid rods 46 and 47 are shown in differently raised positions in respect of the grid plane. For raising the grid rods 46 and 47, crank or pivot arms 49 which are pivotal from the outside by way of an operating shaft 50 are provided in recesses 48 on the inside of the walls of the respective shafts 3 and 4. The movable grid rods 46 and 47 are elongated by comparison with the stationary grid rods 45 and are combined in a raisable or lowerable structural unit, the extensions of the grid rods 46 and 47 according to FIG. 6 take the form of crank arms 46a or 46a respectively of different lengths. The result of this is that during a pivoting movement of the crank arms 49 about the pivoting axis 50 the grid rods 46 and 47 are raised to different levels as will be apparent from the right hand half of FIG. 6.

Figure 8A:
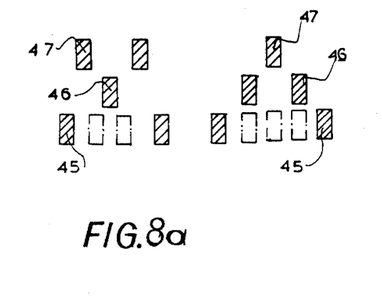
FIGS. 8a and 8b are diagrams of possible positions of the grate rods in their arrangement and construction according to FIGS. 6 and 7.
Figure 8B:
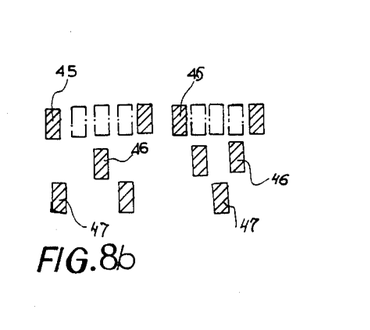

Instead of raising the movable grid rods 46 and 47, it is also possible to provide in the reverse sense a lowering of such grid rods. The different possible positions of th grid rods 45 to 47 during raising or lowering of the movable grid rods 46 and 47 are illustrated in FIGS. 8a and 8b. In that case the grid rods in the grid plane are shown dash-dotted whilst they are shaded in the remaining positions.

Figure 7:
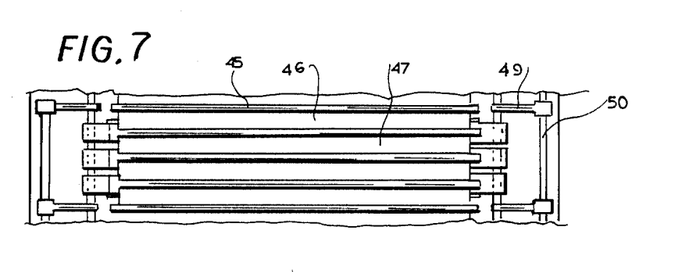
FIG. 7 is a plan view of the construction according to FIG. 6.
Figure 9:
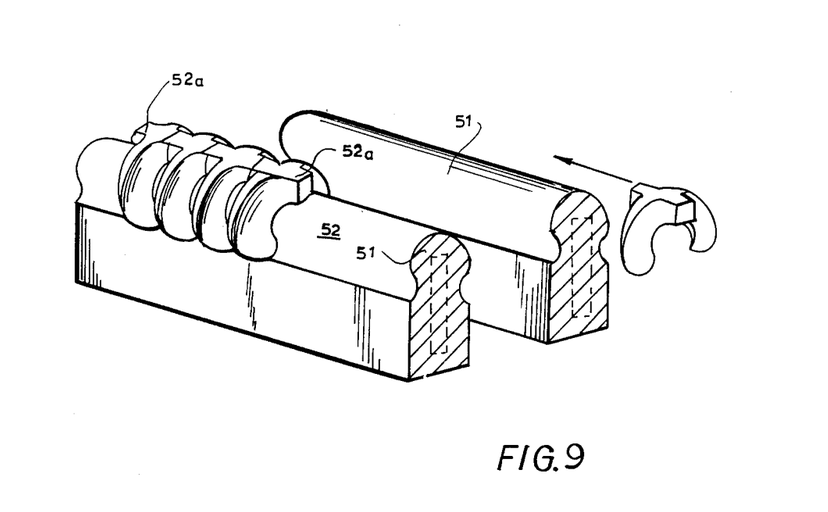
FIG. 9 is a perspective view of two grate rods with partly applied rider-shaped profile members.
Figure 10:
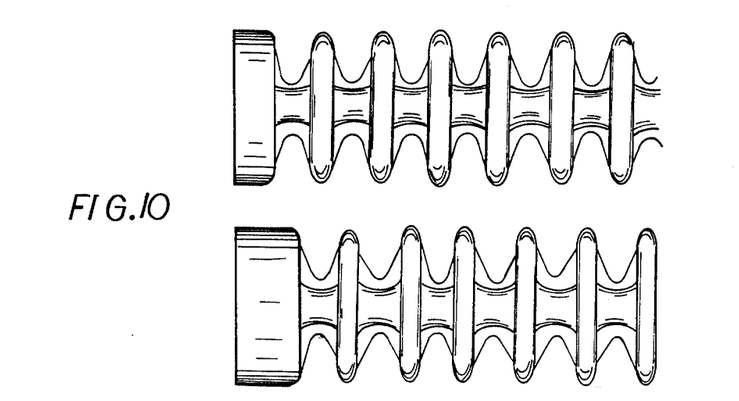
FIG. 10 is a partial plan view of the grate rod of FIG. 9 with the rider-shaped profile members thereon.

The grid rods 45 to 47 diagrammatically illustrated in FIGS. 6 and 7, in practice advantageously have the configuration illustrated in FIGS. 9 and 10. In that case the grid rods may be solid or, as illustrated in broken lines in FIG. 9 also in the form of hollow profile rods.

Viewed in cross section according to FIG. 9, the grid rods in their upper region comprise a waist formation 51 in their profile and are provided with interchangeable rider-shaped profile members 52 slidingly applied onto these profile formations. The rider-shaped profile members 52 are of horse-shoe-shaped configuration and comprise projections 26 directed in the longitudinal direction of the grid rods, serving as stop members for adjoining rider-shaped profile member 52. When the rider-shaped profile members 52 are densely packed, there results for the grid rods a configuration which in the plan view of FIG. 2 is shown in respect of two adjoining grid rods.

The grid-shaped profile members 52 have the effect that the layer of material particles which is lowermost in the bed 7 cannot block the interstices between adjoining grid rods. Instead, the rider-shaped profile members 52 take care that the material particles in the lowermost layer of the bed are forced into mutually staggered positions, in particular if the rider-shaped profile members 52 of adjoining grid rods are mutually staggered as shown in the plan view according to FIG. 10. The rider-shaped profile members may moreover, for a given spacing of the grid rods, have mutually differing diameters such that, as a result the percentage free cross sectional areas through the grid 7 may be adjusted or modified accordingly.

It is furthermore possible by virtue of the rider-shaped profile members 52 to modify for a given spacing of the grid rod the free cross sectional areas for the passage of the gases through the grid rods locally or over the entire cross section of the grid. Finally, the rider-shaped profile members also contribute to influencing the free-flow characteristics when moving the movable grid rods from the grid plane.

Figure 11:
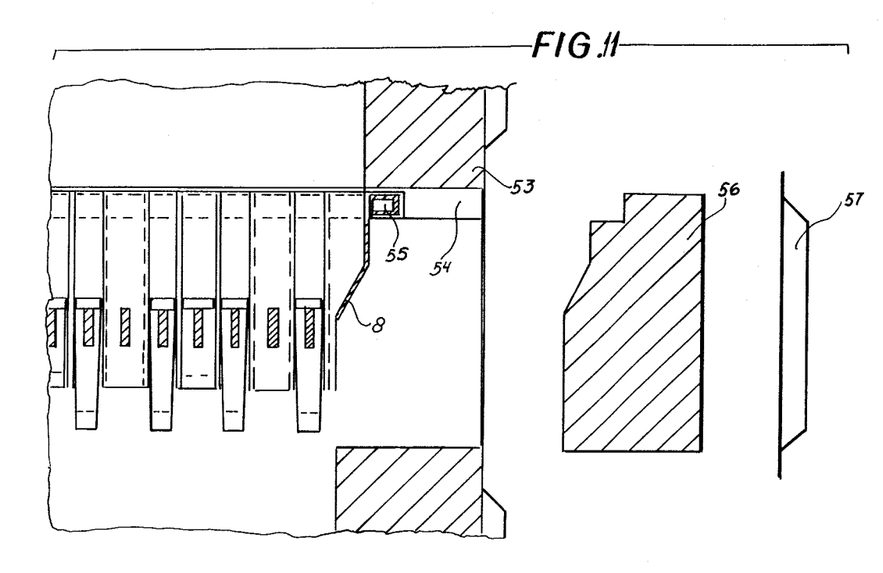
FIG. 11 a partial longitudinal section through the shaft of an adsorber or regenerator according to FIGS. 1 to 5 with laterally insertable grids.

Instead of the modular design of the shaft which is possible for all shaft designs as explained in conjunction with FIG. 2, it is also possible for the walls of the particular shaft to be designed as a continuous shaft wall and to comprise window apertures 53 in accordance with the example of FIG. 11, through which the grids 8 in the form of modular structural units as is advantageous also in the case of the modular construction, may be inserted slidably sideways. In this case the grids 8 which in the described manner are composed of stationary and movable grid rods are held in groove-shaped recesses 54 of the lateral shaft walls by way of a carrier device 55 in the form of a carrier frame. For closing the window aperture 53 in the shaft wall, an appropriate filler member is provided in conjunction with a covering plate 57 which after the insertion of the filler member 56 is screwed against the shaft wall. By the aforesaid design it is possible at low cost to interchange or replace the grids designed as structural units at short notice.

Due to the aforedescribed construction of the shaft designed as an adsorber or as a regenerator, in conjunction with the above described design of the grids, it is possible to maintain the shallow beds of uniform bed thickness across the cross section which is favourable for the material and energy transfer and to convey these beds arranged one above the other at intervals from the top downwardly through the shaft. In this context, due to the manner of movement of the grid rods, the trickle movement of the material particles viewed over the shaft cross section may be so influenced that whenever the trickle process onto the grid further below has been completed, a new bed is formed of which the bed thickness is uniform across the cross section. In the context of the rider-shaped profile members, it is thus also possible to provide for a local modification of the trickle movement, e.g. in the regions of the corners of a shaft of square or rectangular cross section.

Due to the fact that the beds are moved forward only by one level at a time, a considerably reduced abrasion compared with the situation when a material column extending over the entire height of the shaft is moved through the shaft, is attained because the material particles in the individual shallow beds during their being forwarded from one level to the next are not subjected to high static pressure resulting from the material column rising above the material particles. Accordingly, in addition to a substantial improvement of the effects, there is also attained a lower abrasion of the material particles and thereby a longer life expectancy of these material particles.

In the described process or respectively in the apparatus for carrying out the process, the flow through the beds in the respective shaft is rendered more uniform, resulting in an aerodynamic improvement of the effectiveness, i.e. the ratio of transferred energy to expended mechanical energy. A very effective degree of decontamination of the flue gases is attainable with small amounts of activated coke, the abrasion of the activated coke particles being low.

In respect of the process defined in the consistory clause of the introduction, it is particularly advantageous if according to the invention granulates are used having an inactive core of ceramic material and a coating of activated coke produced on the basis of black coal. These have the advantage that for the beds of such granulates, only a relatively small amount of the relatively expensive activated coke is required. Because the material exchange or the adsorption takes place in a relatively thin surface layer of the granulates only, the use of the aforesaid granulates does not diminish their effectiveness in the course of a gas treatment. Such granulates, however, exhibit a high compressive strength and are for that reason particularly suitable for use in moving beds and heaped materials subjected to a gas flow therethrough.

Even after the coating has been substantially removed by abrasion, the void volume required for the flow through the beds is maintained and thereby the aerodynamic effectiveness is ensured in spite of unavoidable abrasion phenomena.

Instead of the apparatus described above in conjunction with FIGS. 6 to 11 comprising grid rods which can in part be moved out of the grid plane, the grids may also in accordance with FIG. 10 have a construction in which the carrier rods 136 extending parallel to one another are supported in a stationary carrying device similar to the carrying device 55 in FIG. 11. The carrier rods 136 may then take the form of hollow rods. Above each of the carrier rods 136 louvre slats 137 and 138 orientated in a roof-like manner in relation to one another may be provided which transverse to their longitudinal direction comprise slot-shaped passages 139. In this context the respective slats 137 are rigidly held by the associated carrying rods 136, for example being welded on, whilst each slat 138 is fixed to a pivoting axis 140 provided above the carrier rod. The pivoting axes in turn are mounted in the frame-shaped carrier device and are connected with pivoting arms 141 projecting upwardly out of the grid plane and being in turn linked to a pushrod 142 connected to a pivoting drive means, such that it can be moved back and forth in the direction of the double arrow 143 and in that manner the pivoting arms 141 can be swung in the direction of the double arrow 144. In that manner the pivotal louvre slats 138 can be moved from the solid line position to the broken line position, and thereby perform a similar task as described above in conjunction with the raisable or lowerable grid rods 46 and 47 according to FIGS. 6 to 8.

Figure 12:
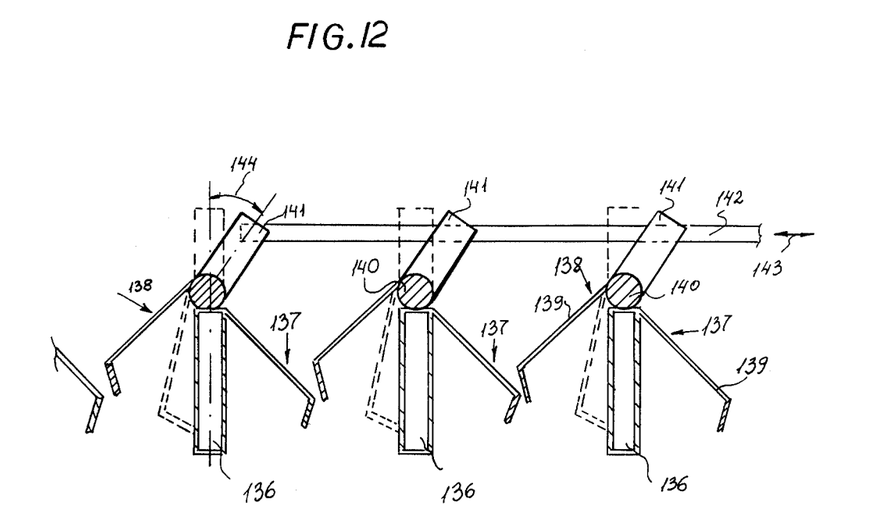
FIG. 12 is a diagrammatic sectional view similar to FIG. 6 through a grate design differing from that of FIGS. 6 to 11.

The grid arrangement according to FIG. 12 may similarly be manufactured as a premanufactured unit and be installed in a modular manner in the shaft, connected to an appropriate crank drive for pivoting the slats 138.

It has been found that by judiciously and skilfully applying the aforegoing teachings, it has been possible to so further develop the process referred to in the introduction that a more effective contacting of the gases with the activated coke takes place, resulting in reduced reaction periods and that between the flow of the large gas quantities and the activated coke a uniform flow takes place, and that thereby a substantial reduction of the amounts of activated coke required for the process may be attained. In addition it has been found that by the new process expedients as applied to the adsorber, it becomes possible in a particularly effective and simple manner also to denitrogenate the flue gases during their passage through the adsorber.

The claims which follow are to be considered an integral part of the present disclosure. Reference numbers (directed to the drawings) shown in the claims serve to facilitate the understanding of the claims, but are not intended to restrict in any way the language of the claims to what is shown in the drawings, unless the contrary is clearly apparent from the context.

We claim:

1. A process for removing sulfur oxides adsorbable by activated coke from flue gas, comprising the steps of:
    (a) forming an adsorption column in a shaft having a substantially uniform cross section over at least a portion of the height thereof by supporting on a multiplicity of vertically spaced bar grates lying in respective horizontal planes respective beds of activated coke particles of a uniform particle size of at least 6 mm and a maximum of 25 mm of the same bed thickness so that each bed extends uniformly over all of said cross section at the respective grate plane and the upper surface of each bed below an uppermost one of said grates is spaced from a next-overlying grate by a free space;
    (b) passing said flue gas upwardly in succession through said beds in said portion from a bed on a lowermost grate of said portion uniformly over said cross section and in a direction perpendicular to said grate planes;
    (c) discharging the bed on said lowermost grate for regeneration upon loading of said bed on said lowermost grate with said substance;
    (d) thereafter shifting, grate-by-grate in time-spaced succession from the bottom to the top of said portion, grate bars of each grate above said lowermost grate out of the respective grate plane to break up the bed thereon and cause the activated coke particles to cascade uniformly all across said cross section through a respective one of the free spaces underlying the grate whose grate bars are shifted onto a next lower grate to reform an activated coke bed of uniform thickness all across said cross section;
    (e) thereafter depositing a new charge of said activated coke particles on said uppermost grate to reform a said bed thereon; and
    (f) regenerating said bed discharged from said lowermost grate so as to remove said sulfur oxides therefrom.

2. The process defined in claim 1 wherein said bed discharged from said lowermost grate is regenerated by:
    (g) depositing the activated coke particles of said bed discharged from said lowermost grate on an uppermost grate of a regenerating shaft having a plurality of horizontal bar grates adapted to receive respective regenerating beds of activated coke with respective free spaces between them;
    (h) passing an inert gas upwardly through said regenerating beds; and
    (i) intermittently transferring said regenerating beds downwardly through said regenerating shaft by:
      (i$_1$) shifting bars of a lowermost grate of said regenerating shaft out of a grate plane thereof and discharging regenerated activated coke particles from said regenerating shaft;
      (i$_2$) then from grate to grate upwardly in said regenerating shaft, shifting respective bars out of respective grate planes to cause the activated coke particles of the beds on each of the grates of said regenerating shaft to cascade uniformly over the cross section thereof onto a next-lower grate and reform a regenerating bed thereon, and
      (i$_3$) depositing activated coke particles to be regenerated on the uppermost grate of said regenerating shaft.

3. The process defined in claim 1 wherein said flue gas is passed through all of the beds of said shaft in counterflow to the movement of said beds therethrough.

4. The process defined in claim 1, further comprising the step of:
    (g) mixing NH$_3$ with said flue gas which also contain nitrogen oxides before it contacts said beds for denitrification of said flue gas in said shaft.

5. The process defined in claim 4, further comprising the step of:

(h) mixing NH₃ with said flue gas after it has passed through at least one of said beds.

6. The process defined in claim 1, further comprising the step of:
(g) mixing NH₃ with said flue gas which also contain nitrogen oxides in at least one of said free spaces after it has passed through at least one of said beds for denitrification of said flue gas in said shaft.

7. The process defined in claim 1, further comprising the step of:
(g) mixing NH₃ with said flue gas which also contain nitrogen oxides after it has traversed at least some of said beds in one of said free spaces and returning the flue gas mixed with NH₃ to pass through at least one bed previously traversed by the flue gas before the mixture of NH₃ therewith.

8. The process defined in claim 7, further comprising the step of:
(h) mixing NH₃ with said flue gas before it is initially passed through said some of said beds.

9. The process defined in claim 2 wherein an inert gas is passed in a circuit upwardly through a lower group of beds in said regenerator shaft so as to be heated therefrom and is then passed upwardly through an upper group of beds in said regenerator shaft so as to preheat the upper group of beds.

10. The process defined in claim 9 wherein excess gas produced in said circuit is combined with the flue gas fed to said adsorption column.

11. The process defined in claim 1 wherein said activated coke particles have inactive ceramic cores coated with activated coke formed from black coal.

12. The process defined in claim 1 for the denitrification of said flue gas, further comprising the step of:
(g) at least partially desulfurizing said flue gas before it is admitted to said adsorption column.

* * * * *